(12) United States Patent
Zhou et al.

(10) Patent No.: US 11,587,431 B2
(45) Date of Patent: Feb. 21, 2023

(54) CONTROL METHOD AND DEVICE FOR SMART SEATED TOILET

(71) Applicant: Xiamen Axent Corporation Limited, Xiamen (CN)

(72) Inventors: Tongqiang Zhou, Xiamen (CN); Yimin Fang, Xiamen (CN); Wensen Chen, Xiamen (CN)

(73) Assignee: XIAMEN AXENT CORPORATION LIMITED, Xiamen (CN)

( * ) Notice: Subject to any disclaimer, the term of this patent is extended or adjusted under 35 U.S.C. 154(b) by 327 days.

(21) Appl. No.: 16/764,813

(22) PCT Filed: Nov. 22, 2018

(86) PCT No.: PCT/CN2018/116919
§ 371 (c)(1),
(2) Date: May 15, 2020

(87) PCT Pub. No.: WO2019/101129
PCT Pub. Date: May 31, 2019

(65) Prior Publication Data
US 2020/0354938 A1  Nov. 12, 2020

(30) Foreign Application Priority Data

Nov. 24, 2017  (CN) .......................... 201711193764.7

(51) Int. Cl.
*G05B 15/02* (2006.01)
*G05B 19/042* (2006.01)
(Continued)

(52) U.S. Cl.
CPC ............... *G08C 17/02* (2013.01); *E03D 5/10* (2013.01); *E03D 9/002* (2013.01); *E03D 9/08* (2013.01);
(Continued)

(58) Field of Classification Search
CPC ........ G05B 15/02; G05B 19/042; E03D 5/10; E03D 9/00
See application file for complete search history.

(56) References Cited

U.S. PATENT DOCUMENTS 7,535,367 B2 * 5/2009 Ratnakar .............. G06Q 10/025
705/5
2006/0242755 A1 * 11/2006 Lohss .................... A47K 13/10
4/246.1
(Continued)

FOREIGN PATENT DOCUMENTS

CN      104831790 A    8/2015
CN      104880956 A    9/2015
(Continued)

OTHER PUBLICATIONS

International Search Report (with English translation) and Written Opinion for PCT/CN2018/116919 dated Feb. 26, 2019; 11 pages.

*Primary Examiner* — Mark A Connolly
(74) *Attorney, Agent, or Firm* — Schwabe, Williamson & Wyatt, PC

(57) ABSTRACT

A control method and device for a smart seated toilet. The method comprises: by acquiring function usage limitation information of a pre-set function provided by the smart seated toilet, judging whether the function usage limitation information satisfies conditions for allowing a user to use; if so, unlocking the pre-set function; and if not, then locking the pre-set function. By verifying the usage of a smart seated toilet, usage limitations of different functions of the smart seated toilet are realized, and convenience for users is improved.

14 Claims, 1 Drawing Sheet

(51) Int. Cl.
  *E03D 5/10* (2006.01)
  *E03D 9/00* (2006.01)
  *G08C 17/02* (2006.01)
  *E03D 9/08* (2006.01)
  *G16Y 40/30* (2020.01)

(52) U.S. Cl.
  CPC ........... G05B 15/02 (2013.01); G05B 19/042 (2013.01); *G05B 2219/2642* (2013.01); *G16Y 40/30* (2020.01)

(56) References Cited

U.S. PATENT DOCUMENTS

2012/0027199 A1\* 2/2012 Haider .................... G06F 21/34
  713/189
2015/0000026 A1\* 1/2015 Elements ................ G06F 3/041
  4/443

FOREIGN PATENT DOCUMENTS

| CN | 105242600 A | 1/2016 |
|----|-------------|--------|
| CN | 106647306 A | 5/2017 |
| CN | 106789456 A | 5/2017 |
| CN | 107869172 A | 4/2018 |
| JP | 2009108637 A | 5/2009 |

\* cited by examiner

CONTROL METHOD AND DEVICE FOR SMART SEATED TOILET

CROSS-REFERENCE TO RELATED APPLICATION

The present application is a national phase entry under 35 U.S.C. § 371 of International Application No. PCT/CN2018/116919, filed Nov. 22, 2018, entitled "CONTROL METHOD AND DEVICE FOR SMART SEATED TOILET," which designates the United States of America, which claims priority to CN Application No. 201711193764.7, filed Nov. 24, 2017, the entire disclosures of each of these applications are hereby incorporated by reference in their entireties and for all purposes.

FIELD

The present disclosure relates to the technical field of Internet of Things, and in particular, to a control method and a control device for an intelligent toilet.

BACKGROUND

Intelligent toilets have changed the traditional way people go to the toilet from using toilet paper to washing with water, which triggered a "bathroom revolution". A development trend of the bathroom in future is towards technology, convenience and hygiene. Although the intelligent toilets have entered Chinese market for many years, it has still a very low popularity. Consumers have low awareness of intelligent toilets and misunderstandings for these products, and can hardly switch from the habit of use of traditional sitting toilets, and the price of intelligent toilets is high, which hinders the popularization of intelligent toilets. In addition, due to exceptional nature of the sitting toilet, in generally, consumers are reluctant to try it in a place other than home. At present, communication connection between the intelligent toilet and other devices is very limited, and how to improve communication function of the intelligent toilet so as to enable a wider range of application of intelligent toilets is currently a problem to be solved.

SUMMARY

In order to solve the problems in the prior art, the present disclosure provides a control method and a control device for an intelligent toilet. The intelligent toilet is controlled by a terminal and a server, so as to realize the control and use of the intelligent toilet, which greatly improves the convenience and facilitates the popularization of intelligent toilets.

An embodiment of the present disclosure provides a control method for a intelligent toilet, and the method includes:

obtaining function usage restriction information of a preset function provided by the intelligent toilet;

determining whether the function usage restriction information meets a condition for allowing use of a user;

unlocking the preset function in a case that the function usage restriction information meets the condition for allowing use of the user; and locking the preset function in a case that the function usage restriction information does not meet the condition for allowing use of the user.

Optionally, determining whether the function usage restriction information meets the condition for allowing use of the user includes:

determining, in response to an instruction for triggering the preset function sent by a terminal, whether the function usage restriction information meets the condition for allowing use of the user; and/or determining, according to a signal for triggering the preset function sent by a remote controller, whether the function usage restriction information meets the condition for allowing use of the user, where the signal for triggering the preset function is used to trigger the preset function; and/or determining, according to a signal generated by the user triggering a preset function operation key on the intelligent toilet, whether the function usage restriction information meets the condition for allowing use of the user.

Optionally, the function usage restriction information includes at least one of the following: a remaining number of uses of the preset function and a remaining time of use of the preset function;

in a case that the function usage restriction information includes the remaining number of uses of the preset function, unlocking the preset function in a case that the function usage restriction information meets the condition for allowing use of the user includes: unlocking the preset function in a case that the remaining number of uses is greater than a preset number of uses, and locking the preset function in a case that the function usage restriction information does not meet the condition for allowing use of the user includes: locking the preset function in a case that the remaining number of uses is less than or equal to the preset number of uses; and in a case that the function usage restriction information includes the remaining time of use of the preset function, unlocking the preset function in a case that the function usage restriction information meets the condition for allowing use of the user includes: unlocking the preset function in a case that the remaining time of use is longer that a preset duration, and locking the preset function in a case that the function usage restriction information does not meet the condition for allowing use of the user includes: locking the preset function in a case that the remaining time of use is less than or equal to the preset duration.

Optionally, obtaining function usage restriction information of allowing the user to use the preset function of the intelligent toilet includes:

receiving first function usage restriction information of allowing the user to use the preset function of the intelligent toilet sent by a server.

Optionally, obtaining function usage restriction information of allowing the user to use the preset function of the intelligent toilet includes:

receiving second function usage restriction information of allowing the user to use the preset function of the intelligent toilet sent by a terminal, where the second function usage restriction information is encrypted by the server; and decrypting the second function usage restriction information to obtain the function usage restriction information.

Optionally, the method further includes:

updating the function usage restriction information according to usage of the preset function of the user; and sending the updated function usage restriction information to a server, or encrypting the updated function usage restriction information and sending the encrypted updated function usage restriction information to a terminal.

Optionally, before obtaining function usage restriction information of allowing the user to use the preset function of the intelligent toilet, the method further includes:
obtaining a user level of the user; and
determining, according to the user lever of the user, a preset function that is allowed to be used by the user.

Optionally, the preset function includes at least one of the following: a hip washing function, a bidet function, a water temperature adjustment function, a seat temperature adjustment function, a mobile cleaning function, a nozzle self-cleaning function, a seat and cover slow descending function, a hot air drying function, a wind temperature adjustment function, a nozzle adjustment function, an automatic flushing function, a seat and cover automatic opening and closing function, a deodorizing function, a cleaning massage function, a flushing strength adjustment function, a remote control function, a lighting function, a a multimedia function, a disinfection function, a memory function, an APP function and a WIFI function.

An embodiment of the present disclosure further provides a control device for an intelligent toilet, and the device includes:
a function usage restriction information obtaining unit, configured to obtain function usage restriction information of a preset function provided by the intelligent toilet;
a user usage condition determination unit, configured to determine whether the function usage restriction information meets a condition for allowing use of a user;
an unlocking unit, configure to unlock the preset function in a case that the function usage restriction information meets the condition for allowing use of the user; and
a locking unit, configured to lock the preset function in a case that the function usage restriction information does not meet the condition for allowing use of the user.

Optionally, the user usage condition determination unit includes:
a preset function triggering determination unit, configured to determine, in response to an instruction for triggering the preset function sent by a terminal, whether the function usage restriction information meets the condition for allowing use of the user; and/or
a preset function triggering signal determination unit, configured to determine, according to a signal for triggering the preset function sent by a remote controller, whether the function usage restriction information meets the condition for allowing use of the user, where the signal for triggering the preset function is used to trigger the preset function; and/or
a preset function operation key triggering determination unit, configured to determine, according to a signal generated by the user triggering a preset function operation key on the intelligent toilet, whether the function usage restriction information meets the condition for allowing use of the user.

Optionally, the function usage restriction information includes a remaining number of uses of the preset function, where the unlocking unit includes: a first unlocking subunit configured to unlock the preset function in a case that the remaining number of uses is greater than a preset number of uses, and the locking unit includes: a first locking subunit configured to lock the preset function in a case that the remaining number of uses is less than or equal to the preset number of uses.

Optionally, the function usage restriction information includes a remaining time of use of the preset function, where the unlocking unit includes: a second unlocking subunit configured to unlock the preset function in a case that the remaining time of use is longer than a preset duration; and the locking unit includes: a second locking subunit configured to lock the preset function in a case that the remaining time of use is less than or equal to the preset duration.

Optionally, the function usage restriction information obtaining unit includes:
a first function usage restriction information receiving subunit, configured to receive first function usage restriction information of allowing the user to use the preset function of the intelligent toilet sent by a server.

Optionally, the function usage restriction information obtaining unit includes:
a second function usage restriction information receiving subunit, configured to receive second function usage restriction information of allowing the user to use the preset function of the intelligent toilet sent by a terminal, where the second function usage restriction information is encrypted by the server; and
a decryption subunit, configured to decrypt the second function usage restriction information to obtain the function usage restriction information.

Optionally, the device further includes:
a function usage restriction information updating unit, configured to update the function usage restriction information according to usage of the preset function of the user; and
a first sending subunit of function usage restriction information, configured to send the updated function usage restriction information to a server;
and/or
a second sending subunit of function usage restriction information, configured to encrypt the updated function usage restriction information and send the encrypted updated function usage restriction information to a terminal.

Optionally, the device further includes:
a user level obtaining subunit, configured to obtain a user level of the user, and determine, according to the user lever of the user, a preset function that is allowed to be used by the user.

Beneficial Effects

Embodiments of the present disclosure provide a control method and a control device for an intelligent toilet. Whether function usage restriction information meets a condition for allowing use of a user is determined by obtaining the function usage restriction information of a preset function provided by the intelligent toilet, if so, the preset function is unlocked, and if not, the preset function is locked. By verifying the usage of the intelligent toilet, usage restriction of different functions of the intelligent toilet is realized, and more plentiful and comprehensive services can be provided for users whose function usage restriction information meets the condition of allowing use of the users, thereby improve convenience for the users.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF EMBODIMENTS

In order to enable those skilled in the art to better understand the solutions of the present application, the technical solutions in the embodiments of the present application will be described clearly and completely in conjunction with the drawings in the embodiments of the present application. It is obvious that the described embodiments are only a part of the embodiments according to the present application, rather than all of the embodiments. All the to other embodiments obtained by those skilled in the art based on the embodiments in the present application without any creative work belong to the scope of protection of the present application.

Figure 1:
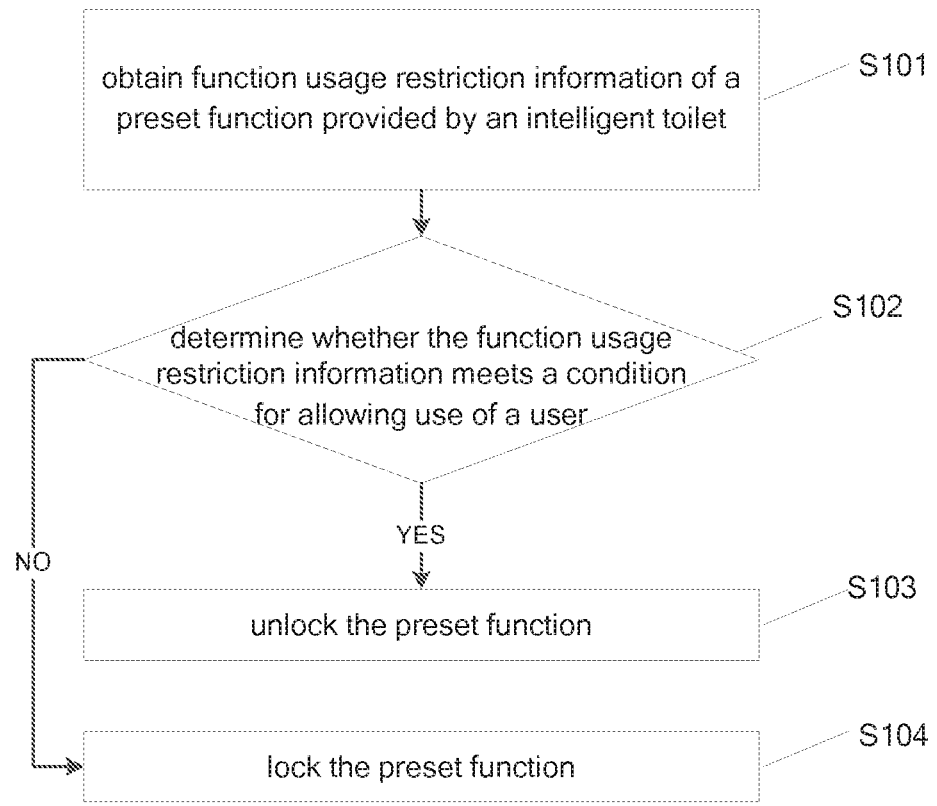
FIG. 1 is a flowchart of a control method for an intelligent toilet according to an embodiment of the present disclosure.
Figure 2:
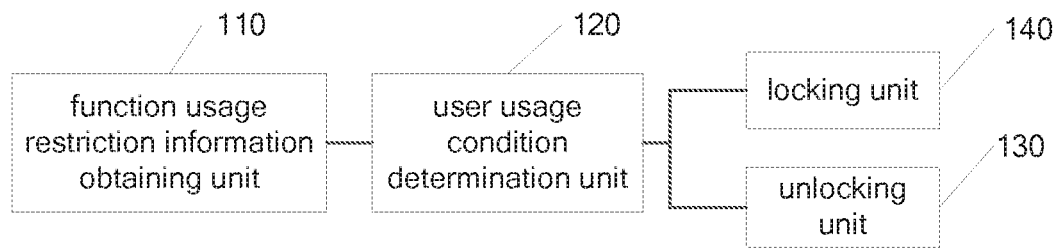
FIG. 2 is a structural block diagram of a control device for an intelligent toilet according to an embodiment of the present disclosure.

In order to enable a toilet to provide more convenient and faster services, the present disclosure provides a control method for an intelligent toilet. FIG. 1 is a flowchart of a control method for an intelligent toilet according to an embodiment of the present disclosure. The method may include the following steps S101 to S104.

In step S101, function usage restriction information of a preset function provided by the intelligent toilet is obtained.

Before using the intelligent toilet, a user may register through a terminal to obtain user information, and a server stores the user information. The user information may include a user name, a password, balance, and function usage authority associated with the user name. As a preferred embodiment, the user information may further include a user level, and the number and types of functions that can be used by different user levels are different.

After the user registers through the terminal, the terminal establishes a wireless connection with the intelligent toilet, where the terminal may be a terminal communication device such as a mobile phone, an iPad, or a laptop. A wireless connection function may be set in the intelligent toilet. The wireless connection between the terminal and the intelligent toilet may be a Bluetooth connection. The terminal searches and selects a name of the intelligent toilet, and establishes the Bluetooth connection.

After the terminal establishes the wireless connection with the intelligent toilet, the intelligent toilet sends a unique identifier of the intelligent toilet to the terminal. The unique identifier may be a serial number of the intelligent toilet, or other identifiers that can distinguish different intelligent toilets. After the wireless connection is established, the intelligent toilet may actively send the unique identifier to the terminal, or the terminal may initiate a unique identifier acquisition request to the intelligent toilet, and then the smart toilet sends the unique identifier to the terminal in response to the request.

After receiving the unique identifier of the intelligent toilet, the terminal forwards the unique identifier to the server, and the server binds the unique identifier to the user information obtained by the user through registration.

The terminal or the server may obtain information on the functions that the intelligent toilet may provide through the unique identifier of the intelligent toilet, for example, information of the following functions may be included: a hip washing function, a bidet function, a water temperature adjustment function, a seat temperature adjustment function, a mobile cleaning function, a nozzle self-cleaning function, a seat and cover slow descending function, a hot air drying function, a wind temperature adjustment function, a nozzle adjustment function, an automatic flushing function, a seat and cover automatic opening and closing function, a deodorizing function, a cleaning massage function, a flushing strength adjustment function, a remote control function, a lighting function, a multimedia function, a disinfection function, a memory function, an APP function and a WIFI function.

The preset function provided by the intelligent toilet may be one or more of all functions provided by the intelligent toilet. After receiving the unique identifier sent by the terminal, the server may obtain the function usage restriction information about all functions provided by the intelligent toilet corresponding to the user information, and send the function usage restriction information to the terminal for the user to view. The function usage restriction information about all functions includes function usage restriction information of the preset function required by the user. The server may also encrypt the obtained function usage restriction information and send the encrypted function usage restriction information to the intelligent toilet, so that the smart toilet decrypts the encrypted function usage restriction information to obtain the function usage restriction information of all functions corresponding to the user information.

In other embodiments of the present application, the server may also determine the preset function that the user is allowed to use according to the user level, and send the preset function to the terminal and the intelligent toilet. For example, when the user level is one, all the functions of the product are available, such as the hip washing function, the bidet function, the water temperature adjustment function, the seat temperature adjustment function, the mobile cleaning function, the nozzle self-cleaning function, the seat and cover slow descending function, the hot air drying function, the wind temperature adjustment function, the nozzle adjustment function, the automatic flushing function, the seat and cover automatic opening and closing function, the deodorizing function, the cleaning massage function, the flushing strength adjustment function, the remote control function, the lighting function, the multimedia function, the disinfection function, the memory function, the APP function and the WIFI function. When the user level is two, main functions of the product are available, such as the hip washing function, the bidet function, the water temperature adjustment function, the seat temperature adjustment function, the mobile cleaning function, the nozzle self-cleaning function, the seat and cover slow descending function, the hot air drying function, the wind temperature adjustment function, the nozzle adjustment function, the automatic flushing function, the deodorizing function, the flushing strength adjustment function, the remote control function, the lighting function and the disinfection function. When the user level is three, basic functions of the product are available, such as the seat temperature adjustment function, the mobile cleaning function, the lighting function and the disinfection function. When the user level is four, any functions other than mechanical functions, such as the flushing function and the seat temperature adjustment function, are not available.

In other embodiments of the present disclosure, the terminal or the intelligent toilet may also initiate acquisition of function usage restriction information of the preset function.

Specifically, the intelligent toilet may send an information acquisition request to the terminal, and the terminal forwards the information acquisition request to the server. The information acquisition request carries the unique identifier of the intelligent toilet and an identifier of the preset function. The intelligent toilet may also send all functions to the terminal, and the terminal displays all the functions for the user to view. After the user selects a preset function, the terminal sends the information acquisition request to the server.

After receiving the information acquisition request, the server may obtain function usage restriction information that matches the user information and/or the unique identifier in first information according to the user information and/or the unique identifier in the first information. The function usage restriction information may be at least one of a remaining number of uses of the preset function and a remaining time of use of the preset function.

The server may obtain matching first function usage restriction information according to the user information and/or the unique identifier, and send the first function usage restriction information to the intelligent toilet. The first function usage restriction information may be encrypted by an encryption algorithm or unencrypted, which does not affect the implementation of the embodiments of the present disclosure. After receiving the encrypted first function usage restriction information, the intelligent toilet uses a same encryption algorithm as the server for decryption.

In the embodiment of the present disclosure, the server may also encrypt the obtained function usage restriction information through the encryption algorithm. Second function usage restriction information may be same information as the first function usage restriction information, specific information for a certain function, or information more detailed than the first function usage restriction information. The second function usage restriction information is sent to the terminal and forwarded to the intelligent toilet by the terminal. After receiving the second function usage restriction information, the intelligent toilet decrypts the second function usage restriction information to obtain the function usage restriction information of the preset function provided by the intelligent toilet.

The intelligent toilet may store the received function usage restriction information for verification when the user uses the preset function.

In step S102, it is determined whether the function usage restriction information meets a condition for allowing use of the user, if so, S103 is performed, and if not, step S104 is performed.

In step S103, the preset function is unlocked.

In step S104, the preset function is locked.

After the intelligent toilet obtains the function usage restriction information of the preset function, if the user needs to use the preset function, an instruction for triggering the preset function may be sent through the terminal. For example, the instruction for triggering the preset function may be sent by a mobile phone APP. The user may also send a signal for triggering the preset function by a remote controller, where the signal for triggering the preset function is used to trigger the preset function. The user may also generate a signal by triggering a preset function operation key on the intelligent toilet. After receiving the instruction for triggering the preset function, the signal for triggering the preset function, or the signal generated by the user triggering the preset function operation key on the intelligent toilet, the intelligent toilet may verify the function usage restriction information of the preset function by the user, that is, it is determined whether the function usage restriction information meets the condition for allowing use of the user.

Specifically, if the function usage restriction information includes the remaining number of uses of the preset function, it is determined whether the remaining number of uses of the preset function is greater than a preset number of uses. If so, the preset function is unlocked, and the intelligent toilet may provide the user with a service corresponding to the preset function. If the remaining number of uses of the preset function is less than or equal to the preset number of uses, the preset function is locked, that is, the intelligent toilet does not provide the user with the service corresponding to the preset function. The preset number of uses may be zero, for example, the remaining number of uses of the hot air drying function is three, which is greater than the preset number of uses zero, so the hot air drying function is unlocked, and the user can use the hot air drying function.

If the function usage restriction information includes the remaining time of use of the preset function, it is determined whether the remaining time of use is longer than a preset duration. If so, the preset function is unlocked, and the intelligent toilet may provide the user with the service corresponding to the preset function. If the remaining time of use is less than or equal to the preset duration, the preset function is locked, that is, the intelligent toilet does not provide the user with the service corresponding to the preset function. The preset duration may be set to zero, for example, a time limit of the hot air drying function purchased by the user is one month. Within one month, the remaining time of use is longer than the preset duration, and the preset function is in the unlocked state. After more than one month, the remaining time of use is equal to the preset duration, the function is locked, and the user cannot use the hot air drying function. In other embodiments of the present application, it may also be determined according to the user level whether the function usage restriction information meets the condition for allowing use of the user. For example, when the user level is four, the functions other than the flushing function and seat temperature adjustment are locked, and the user can only use these two functions.

After the user enjoys the service provided by the intelligent toilet, the function usage restriction information may be updated according to the usage of the user, where the usage of the user may include a number of uses and a time of use corresponding to each function. The intelligent toilet sends the updated function usage restriction information to the server for storage by the server. The intelligent toilet may also encrypt the updated function usage restriction information and send the encrypted function usage restriction information to the terminal, which is forwarded to the server by the terminal. The server decrypts the received encrypted function usage restriction information and stores the decrypted function usage restriction information.

Embodiments of the present disclosure provide a control method and a control device for an intelligent toilet. Whether function usage restriction information meets a condition for allowing use of a user is determined by obtaining the function usage restriction information of a preset function provided by the intelligent toilet, if so, the preset function is unlocked, and if not, the preset function is locked. By verifying the usage of the intelligent toilet, usage restriction of different functions of the intelligent toilet is realized, and more plentiful and comprehensive services can be provided for users whose function usage restriction information meets the condition of allowing use of the users, thereby improve convenience for the users.

Based on the above control method for an intelligent toilet, a control device for a smart toilet is further provided according to an embodiment of the present disclosure. The device includes:

a function usage restriction information obtaining unit 110, configured to obtain function usage restriction information of a preset function provided by an intelligent toilet;

a user usage condition determination unit 120, configured to determine whether the function usage restriction information meets a condition for allowing use of a user;

an unlocking unit 130, configured to unlock the preset function in a case that the function usage restriction information meets the condition for allowing use of the user; and a locking unit 140, configured to lock the preset function in a case that the function usage restriction information does not meet the condition for allowing use of the user.

Optionally, the user usage condition determination unit 120 includes:

a preset function triggering determination unit, configured to determine, in response to an instruction for triggering the preset function sent by a terminal, whether the function usage restriction information meets the condition for allowing use of the user; and/or a preset function triggering signal determination unit, configured to determine, according to a signal for triggering the preset function sent by a remote controller, whether the function usage restriction information meets the condition for allowing use of the user, where the signal for triggering the preset function is used to trigger the preset function; and/or a preset function operation key triggering determination unit, configured to determine, according to a signal generated by the user triggering a preset function operation key on the intelligent toilet, whether the function usage restriction information meets the condition for allowing use of the user.

The function usage restriction information may be at least one of a remaining number of uses of the preset function and a remaining time of use of the preset function.

In a case that the function usage restriction information includes the remaining number of uses of the preset function, the unlocking unit 130 includes a first unlocking subunit configured to unlock the preset function in a case that the remaining number of uses is greater than a preset number of uses, and the locking unit 140 includes a first locking subunit configured to lock the preset function in a case that the remaining number of uses is less than or equal to the preset number of uses.

In a case that the function usage restriction information includes the remaining time of use of the preset function, the unlocking unit 130 includes a second unlocking subunit configured to unlock the preset function in a case that the remaining time of use is longer than a preset duration, and the locking unit 140 includes a second locking subunit configured to lock the preset function in a case that the remaining time of use is less than or equal to the preset duration.

Optionally, the function usage restriction information obtaining unit includes:

a first function usage restriction information receiving subunit, configured to receive first function usage restriction information of allowing the user to use the preset function of the intelligent toilet sent by a server.

Optionally, the function usage restriction information obtaining unit 110 includes:

a second function usage restriction information receiving subunit, configured to receive second function usage restriction information of allowing the user to use the preset function of the intelligent toilet sent by a terminal, where the second function usage restriction information is encrypted by the server; and a decryption subunit, configured to decrypt the second function usage restriction information to obtain the function usage restriction information.

Optionally, the device further includes:

a function usage restriction information updating unit, configured to update the function usage restriction information according to usage of the preset function of the user.

a first sending subunit of function usage restriction information, configured to send the updated function usage restriction information to a server; and/or a second sending subunit of function usage restriction information, configured to encrypt the updated function usage restriction information and send the encrypted updated function usage restriction information to a terminal.

Optionally, the device further includes a user level obtaining subunit configured to obtain a user level of the user, and determine, according to the user lever of the user, a preset function that is allowed to be used by the user.

When introducing elements of various embodiments of the present application, the articles "a", "an", "this" and "the" are intended to cover one or more elements. The terms "include", "contain" and "have" are all inclusive and mean that there can be other elements besides the listed elements.

It should be noted that those of ordinary skill in the art can understand that all or some of the processes in the above method embodiments may be completed by a computer program instructing relevant hardware. The program may be stored in a computer-readable storage medium. When the program is executed, it may include the processes of the foregoing method embodiments. The storage medium may be a magnetic disk, an optical disk, a read-only memory (Read-Only Memory, ROM) or a random access memory (Random Access Memory, RAM), etc.

The embodiments in this specification are described in a progressive manner. The same or similar parts between the embodiments can be referred to each other, and each embodiment focuses on the differences from other embodiments. In particular, for the device embodiment, since it is basically similar to the method embodiment, the description is relatively simple, and the relevant part can be referred to the description of the method embodiment. The device embodiments described above are only schematic, where the units and modules described as separate components may or may not be physically separated. In addition, some or all of the units and modules may be selected according to actual needs to achieve the purpose of the solution of this embodiment. Those of ordinary skill in the art can understand and implement without paying creative labor.

The above is only the specific implementation of this application. It should be pointed out that for those of ordinary skill in the art, without departing from the principles of this application, a number of improvements and retouches can be made, which should fall within the scope of protection of this disclosure.

INDUSTRIAL APPLICABILITY

In the present disclosure, by verifying the usage of the intelligent toilet, usage restriction of different functions of the intelligent toilet is realized, and more plentiful and comprehensive services can be provided for users whose function usage restriction information meets the condition of allowing use of the users, thereby improve convenience for the users.

The invention claimed is:

1. A control method for an intelligent toilet, the method comprising:

obtaining function usage restriction information of a preset function provided by the intelligent toilet;

determining whether the function usage restriction information meets a condition for allowing use of a user;
unlocking the preset function in a case that the function usage restriction information meets the condition for allowing use of the user;
locking the preset function in a case that the function usage restriction information does not meet the condition for allowing use of the user; and
updating the function usage restriction information according to usage of the preset function of the user.

2. The method according to claim 1, wherein determining whether the function usage restriction information meets the condition for allowing use of the user comprises:
determining, in response to an instruction for triggering the preset function sent by a terminal, whether the function usage restriction information meets the condition for allowing use of the user; and/or
determining, according to a signal for triggering the preset function sent by a remote controller, whether the function usage restriction information meets the condition for allowing use of the user, wherein the signal for triggering the preset function is used to trigger the preset function; and/or
determining, according to a signal generated by the user triggering a preset function operation key on the intelligent toilet, whether the function usage restriction information meets the condition for allowing use of the user.

3. The method according to claim 1, wherein the function usage restriction information comprises at least one of a remaining number of uses of the preset function and a remaining time of use of the preset function, wherein:
in a case that the function usage restriction information comprises the remaining number of uses of the preset function, unlocking the preset function in a case that the function usage restriction information meets the condition for allowing use of the user comprises: unlocking the preset function in a case that the remaining number of uses is greater than a preset number of uses, and locking the preset function in a case that the function usage restriction information does not meet the condition for allowing use of the user comprises: locking the preset function in a case that the remaining number of uses is less than or equal to the preset number of uses; and
in a case that the function usage restriction information comprises the remaining time of use of the preset function, unlocking the preset function in a case that the function usage restriction information meets the condition for allowing use of the user comprises: unlocking the preset function in a case that the remaining time of use is longer than a preset duration, and locking the preset function in a case that the function usage restriction information does not meet the condition for allowing use of the user comprises: locking the preset function in a case that the remaining time of use is less than or equal to the preset duration.

4. The method according to claim 1, wherein obtaining function usage restriction information of allowing the user to use the preset function of the intelligent toilet comprises:
receiving first function usage restriction information of allowing the user to use the preset function of the intelligent toilet sent by a server; and/or
receiving second function usage restriction information of allowing the user to use the preset function of the intelligent toilet sent by a terminal, wherein the second function usage restriction information is encrypted by the server, and decrypting the second function usage restriction information to obtain the function usage restriction information.

5. The method according to claim 1, further comprising:
sending the updated function usage restriction information to a server, and/or encrypting the updated function usage restriction information and sending the encrypted updated function usage restriction information to a terminal.

6. The method according to claim 1, wherein before obtaining function usage restriction information of allowing the user to use the preset function of the intelligent toilet, the method further comprises:
obtaining a user level of the user; and
determining, according to the user lever of the user, a preset function that is allowed to be used by the user.

7. The method according to claim 1, wherein the preset function comprises at least one of the following:
a hip washing function, a bidet function, a water temperature adjustment function, a seat temperature adjustment function, a mobile cleaning function, a nozzle self-cleaning function, a seat and cover slow descending function, a hot air drying function, a wind temperature adjustment function, a nozzle adjustment function, an automatic flushing function, a seat and cover automatic opening and closing function, a deodorizing function, a cleaning massage function, a flushing strength adjustment function, a remote control function, a lighting function, a multimedia function, a disinfection function, a memory function, an APP function and a WIFI function.

8. A control device for an intelligent toilet, the device comprising:
a function usage restriction information obtaining unit, configured to obtain function usage restriction information of a preset function provided by the intelligent toilet;
a user usage condition determination unit, configured to determine whether the function usage restriction information meets a condition for allowing use of a user;
an unlocking unit, configure to unlock the preset function in a case that the function usage restriction information meets the condition for allowing use of the user;
a locking unit, configured to lock the preset function in a case that the function usage restriction information does not meet the condition for allowing use of the user; and
a function usage restriction information updating unit, configured to update the function usage restriction information according to usage of the preset function of the user.

9. The device according to claim 8, wherein the user usage condition determination unit comprises:
a preset function triggering determination unit, configured to determine, in response to an instruction for triggering the preset function sent by a terminal, whether the function usage restriction information meets the condition for allowing use of the user; and/or
a preset function triggering signal determination unit, configured to determine, according to a signal for triggering the preset function sent by a remote controller, whether the function usage restriction information meets the condition for allowing use of the user, wherein the signal for triggering the preset function is used to trigger the preset function; and/or
a preset function operation key triggering determination unit, configured to determine, according to a signal generated by the user triggering a preset function operation key on the intelligent toilet, whether the function usage restriction information meets the condition for allowing use of the user.

10. The device according to claim 8, wherein the function usage restriction information comprises a remaining number of uses of the preset function, wherein
the unlocking unit comprises:
a first unlocking subunit, configured to unlock the preset function in a case that the remaining number of uses is greater than a preset number of uses; and
the locking unit comprises:
a first locking subunit, configured to lock the preset function in a case that the remaining number of uses is less than or equal to the preset number of uses.

11. The device according to claim 8, wherein the function usage restriction information comprises a remaining time of use of the preset function, wherein
the unlocking unit comprises:
a second unlocking subunit, configured to unlock the preset function in a case that the remaining time of use is longer than a preset duration; and
the locking unit comprises:
a second locking subunit, configured to lock the preset function in a case that the remaining time of use is less than or equal to the preset duration.

12. The device according to claim 8, wherein the function usage restriction information obtaining unit comprises: a first function usage restriction information receiving subunit, configured to receive first function usage restriction information of allowing the user to use the preset function of the intelligent toilet sent by a server; and/or
the function usage restriction information obtaining unit comprises: a second function usage restriction information receiving subunit, configured to receive second function usage restriction information of allowing the user to use the preset function of the intelligent toilet sent by a terminal, wherein the second function usage restriction information is encrypted by the server; and
a decryption subunit, configured to decrypt the second function usage restriction information to obtain the function usage restriction information.

13. The device according to claim 8, further comprising:
a first sending subunit of function usage restriction information, configured to send the updated function usage restriction information to a server; and/or
a second sending subunit of function usage restriction information, configured to encrypt the updated function usage restriction information and send the encrypted updated function usage restriction information to a terminal.

14. The device according to claim 8, further comprising:
a user level obtaining subunit, configured to obtain a user level of the user, and determine, according to the user lever of the user, a preset function that is allowed to be used by the user.

* * * * *